(12) United States Patent
Inoue

(10) Patent No.: US 8,561,431 B2
(45) Date of Patent: Oct. 22, 2013

(54) METHOD OF MANUFACTURING OPTICAL FIBER BASE MATERIAL

(75) Inventor: Dai Inoue, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 196 days.

(21) Appl. No.: 12/297,504

(22) PCT Filed: Apr. 18, 2007

(86) PCT No.: PCT/JP2007/058469
§ 371 (c)(1),
(2), (4) Date: Oct. 17, 2008

(87) PCT Pub. No.: WO2007/123163
PCT Pub. Date: Nov. 1, 2007

(65) Prior Publication Data
US 2010/0154480 A1    Jun. 24, 2010

(30) Foreign Application Priority Data

Apr. 18, 2006 (JP) .................................. 2006-114843

(51) Int. Cl.
*C03B 37/01* (2006.01)
(52) U.S. Cl.
USPC ................... 65/426; 65/427; 65/422; 65/416
(58) Field of Classification Search
USPC ............ 65/413, 414, 416, 421, 422, 426, 427
See application file for complete search history.

(56) References Cited

U.S. PATENT DOCUMENTS 4,979,971 A * 12/1990 Kyoto et al. .................... 65/398
(Continued)

FOREIGN PATENT DOCUMENTS

| GB | 2 171 691 | 9/1986 |
| JP | S60-081033 A | 5/1985 |
| JP | S61-270232 A | 11/1986 |
| JP | 2003-081643 | 3/2003 |

OTHER PUBLICATIONS

PCT International Search Report PCT/JP2007/058469; Jul. 10, 2007 (In English from Published Application).

(Continued)

*Primary Examiner* — Queenie Dehghan
(74) *Attorney, Agent, or Firm* — William J. Kubida; Peter J. Meza; Hogan Lovells US LLP

(57) ABSTRACT

A method of manufacturing an optical fiber base material having very little impurity which deteriorates the transmission characteristic of an optical fiber is provided. The method of manufacturing an optical fiber base material including: producing a core member for the optical fiber base material by dehydrating and transparently vitrifying a base material formed by depositing glass particles; and drawing the core member and then adding a cladding thereto at a desired core to cladding ratio, wherein the dehydrating includes suspending the base material in a furnace tube having a heating region in a first atmosphere at a first temperature, the base material passing through the heating region as upwardly moving, and the transparently vitrifying includes situating the base material below once and then allowing the base material to pass through the heating region in a second atmosphere at a second temperature as upwardly moving again.

19 Claims, 6 Drawing Sheets

(56) References Cited

U.S. PATENT DOCUMENTS

| | | | | |
|---|---|---|---|---|
| 5,259,856 | A * | 11/1993 | Ohga et al. | 65/426 |
| 5,713,979 | A * | 2/1998 | Nicholson et al. | 65/424 |
| 2003/0221460 | A1 | 12/2003 | Inoue et al. | |
| 2006/0117801 | A1 * | 6/2006 | Saitou et al. | 65/422 |
| 2007/0022787 | A1 * | 2/2007 | Gupta et al. | 65/416 |

OTHER PUBLICATIONS

Chinese Office Action for application No. 200780013803.9 and partial English translation of the same, mailed Jan. 31, 2011, pp. 11.

Karar, H.; Government of India Patent Office; Office Action, First Examination Report; Dec. 21, 2012; pp. 1-2.

* cited by examiner

METHOD OF MANUFACTURING OPTICAL FIBER BASE MATERIAL

CROSS REFERENCE TO RELATED APPLICATION

The present patent application claims priority of Japanese Patent Application No. 2006-114843 filed Apr. 18, 2006, which is incorporated herein in by this reference.

BACKGROUND

1. Technical Field

The present invention relates to a method of manufacturing an optical fiber base material. More specifically, the present invention relates to a method of manufacturing a base material for a low-loss optical fiber, which is being capable of constantly providing glass base material for an optical fiber containing little impurity such as heavy metal.

2. Description of the Related Art

VAD is well-known as a method of manufacturing base materials for optical fibers. For example, according to this method, glass particles in vapor phase are generated with a core deposition burner and a cladding deposition burner disposed in a reaction chamber; and the glass particles are deposited onto a tip of a starter attached to a shaft which rotatably lifts up, so that a porous base material for an optical fiber composed of a core layer and a cladding layer is manufactured.

Usually, $GeO_2$ having a high refractive index is added to the core layer. Such porous base material for an optical fiber is dehydrated by heating it at approximately 1100 degrees Celsius in a certain atmosphere containing dehydrated gas such as chlorine, and then transparently vitrified by heating the dehydrated material at approximately 1500 degrees Celsius in a certain atmosphere containing inert gas such as helium, so that a core member for an optical fiber base material is obtained.

The heating furnace for dehydrating and transparently vitrifying has heaters in and around a furnace tube, and the furnace tube is shut out the air. In one arrangement, a heater is attached to a position around the center of the longitudinal direction of the furnace tube, and the porous base material is suspended in the furnace tube and moves through a heating region of the heater. Thus, the porous base material is dehydrated or transparently vitrified.

Here, the reason why the porous base material is suspended from above is that it is easy to keep the porous base material vertical by gravity. Therefore, it becomes easy to pass the porous base material through the center of the furnace tube, i.e. the center of the heating region. In addition, it is convenient that the porous base material is pulled up from above in order to appropriately define a length of the porous base material which is processed because a portion of the base material which is heated shrinks longitudinally when it is transparently vitrified.

Moreover, the reason why the porous base material is suspended from above is that the upper portion of the porous base material manufactured by VAD is easily gripped because the starter is attached to the upper portion. Consequently, the top of the furnace tube has an opening portion, the base material is taken in and out from the opening portion. While the base material is processed, the opening portion of the furnace is covered with a lid, so that the inside of the furnace tube is shut out the air. A silica tube made of natural quartz is often employed for the furnace tube because the natural quartz has high heat resistance and little impurity.

Meanwhile, gas constituting atmosphere within the furnace tube is introduced from the lower portion of the furnace tube and discharged from the upper portion of the furnace tube. The reason comes from the fact that since the gas heated in the heating region in the center of the furnace tube generates an ascending current, it is convenient that a stream of the introduced gas is also flowed upwardly so as not to unnecessarily convect the gas.

Thus, the porous base material is placed on upper than the heating region immediately after being introduced because the porous base material is introduced into the furnace tube from the upper portion thereof. Since a step of dehydrating starts at the position where the porous base material is placed on upper than the heating region, subsequent steps usually have been performed as pulling up the porous base material. For example, in Patent Document 1, a step of dehydrating and transparently vitrifying the porous base material is separated into a dehydrating step and a transparently vitrifying step in order to reduce residual chlorine in the base material. The steps progress the following order: inserting the porous base material into the furnace from above; dehydrating the porous base material progressively from the bottom end as falling at an appropriate speed; pulling the base material up into the furnace once after completing the dehydration; falling the base material at an appropriate speed again. Thus, the porous base material is transparently vitrified progressively from the bottom end thereof.

As described above, the direction in which the gas flows is generally opposed to the direction in which the porous base material moves during each step in the conventional art.

The core member manufactured by the above described steps is formed as an optical fiber base material by jacketing the core member with a silica tube, or further depositing a cladding on the outside thereof by another Vapor Phase Deposition to obtain a desired core to cladding ratio.

Patent Document 1: Japanese Patent Application Publication No. 61-270232

An optical fiber obtained by drawing the optical fiber base material manufactured by the above described method could infrequently have a larger transmission loss than usual. When the characteristic of the transmission loss is examined, a transmission region for the short wavelength 1310 nm is larger than a transmission region for the long wavelength 1550 nm. When it is examined more specifically, the peak of losses is found around 900 nm. Consequently, it is considered that the high transmission loss of the optical fiber is caused by contaminating the base material with vanadium when the porous base material is transparently vitrified. It is not preferable that such high transmission loss deteriorates the transmission characteristics of optical fibers.

SUMMARY

Therefore, it is an object of an aspect of the innovations herein to provide a method of manufacturing an optical fiber base material containing very little impurity which deteriorates the transmission characteristic of an optical fiber.

The method of manufacturing an optical fiber base material according to the present invention comprising: producing a core member for the optical fiber base material by dehydrating and transparently vitrifying a base material formed by depositing glass particles; and drawing the core member and then adding a cladding thereto at a desired core to cladding ratio, wherein the dehydrating includes suspending the base material in a furnace tube having a heating region in a first atmosphere at a first temperature, the base material passing through the heating region as upwardly moving, and the transparently vitrifying includes situating the base material below once and then allowing the base material to pass through the heating region in a second atmosphere at a second temperature as upwardly moving again.

After the step of dehydrating, the base material is moved to the starting position of transparently vitrifying while the temperature of the base material is maintained, and then, the temperature is increased and the step of transparently vitrifying starts. Here, it is preferable that the direction in which the base material moves during dehydrating and transparently vitrifying the base material is the same as the direction in which the gas flows in the furnace tube.

After the core member for an optical fiber is formed as described above, the core member is drawn, and then, the cladding is added thereto and the core member with the cladding is dehydrated and transparently vitrified, so that an optical fiber base material having a desired core to cladding ratio can be obtained.

The summary clause does not necessarily describe all necessary features of the embodiments of the present invention. The present invention may also be a sub-combination of the features described above.

According to the present invention, a glass base material for an optical fiber having very little impurity can be manufactured, and an optical fiber having an excellent transmission characteristic can be obtained.

DESCRIPTION OF EXEMPLARY EMBODIMENTS

Some aspects of the invention will now be described based on the embodiments, which do not intend to limit the scope of the present invention, but exemplify the invention. All of the features and the combinations thereof described in the embodiment are not necessarily essential to the invention.

Reviewing the conventional step of dehydrating and transparently vitrifying as described above, the following result is obtained.

Figure 1:
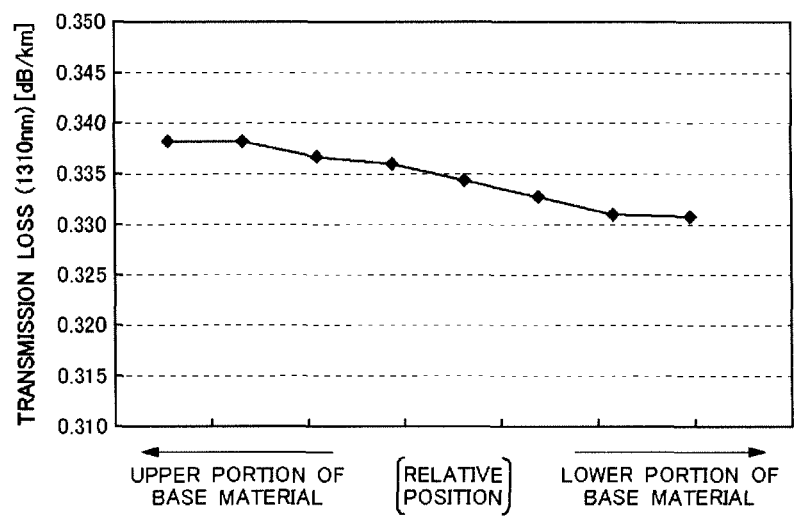
FIG. 1 is a graph showing a distribution of transmission losses in the longitudinal direction of an optical fiber base material.

That is, when the distribution of transmission losses of the optical fiber base material with a high transmission loss is examined longitudinally, the transmission loss is higher at a starter in the upper portion than in the lower portion of the optical fiber base material as shown in FIG. 1. In fact, the base material is transparently vitrified from the lower portion to the upper portion.

The result derives the following mechanism.

Crystallized by heating, fused silica composing the furnace tube becomes porous, and then, heavy metal impurities contained in the fused silica is discharged into the furnace tube. Alternatively, heavy metals heated at a high temperature is discharged from the refractory lining into the atmosphere in the furnace tube, dispersed along the grain boundary of the crystallized quartz, and discharged into the furnace tube. In any case, these heavy metals are taken into the optical fiber base material, which causes a high transmission loss.

The fused silica is progressively crystallized in the step of transparently vitrifying at a high temperature. In addition, the heavy metals are much faster dispersed under a high temperature. In any case, the step of transparently vitrifying where the temperature of the furnace tube becomes high has a greater risk of discharging the heavy metals into the furnace tube. In the step of transparently vitrifying, the porous base material suspended from above is usually moved downwardly.

In other words, firstly, the lower portion of the porous base material is transparently vitrified, next, the upper portion is transparently vitrified. Meanwhile, since the ambient gas is supplied from the lower portion of the furnace tube and flows upwardly, the heavy metals discharged from the heating region at a high temperature basically exists only in the upper portion of the furnace tube. Accordingly, the upper the level of the portion of the porous base material is, the longer a time period over which the porous base material is exposed to the atmosphere containing the heavy metals without being transparently vitrified. This theory is consistent with the result of the distribution of transmission losses as shown in FIG. 1.

In addition to the above consideration, the following invention is achieved as a result of further consideration.

That is, in the step of transparently vitrifying, the porous base material is conventionally moved downwardly, however, the moving direction is inversed, namely, the porous base material is moved upwardly. Therefore, since the base material which passed through the heating region has been transparently vitrified, the base material is not contaminated even if it is exposed to the atmosphere containing heavy metals.

Meanwhile, a porous portion which has not been transparently vitrified is disposed lower than the heating region, and there is a flow of clean gas from bottom toward top. Therefore, the heavy metals discharged from the heating region do not flow downwardly, so that the porous base material is not contaminated.

In addition, when the step of dehydrating is performed by moving the porous base material downwardly and the step of transparently vitrifying is performed by moving the porous base material upwardly, the lower portion of the base material is dehydrated before being transparently vitrified.

Meanwhile, the upper portion of the base material is transparently vitrified before being dehydrated. In this case, a time period until the base material is transparently vitrified after the step of dehydrating is different between the upper portion and the lower portion of the base material.

Since the porous base material contains chlorine after the step of dehydrating and remains partially the high temperature, the base material is continuously treated with chlorine while it is porous. Consequently, the treating time with chlorine is different between the upper portion and the lower portion of the base material.

Moreover, the treating with chlorine causes not only the base material to be dehydrated but also $GeO_2$ forming the core to be volatilized. Therefore, not only the residue of moisture is different but also a refractive index distribution is different between the upward direction and the downward direction. Consequently, it is preferable that the step of dehydrating is performed in the same direction as the step of transparently vitrifying.

The present invention is achieved base on the above described finding. The feature of the present invention includes dehydrating a base material which is suspended in a furnace tube by passing the base material through a heating region as moving the base material upwardly; and transparently vitrifying the base material by moving downwardly the base material to a starting position of transparently vitrifying while the temperature is maintained and passing the base material through the heating region as moving the base material upwardly again. At this time, it is preferable that the gas is supplied from the lower portion of the furnace tube and the moving direction of the porous base material is the same as the direction in which the gas flows in the furnace tube in both the step of dehydrating under the atmosphere containing chlorine at 900 to 1200 degrees Celsius and the step of transparently vitrifying under the atmosphere containing inert gas at 1300 to 1600 degrees Celsius.

Embodiment 1

A porous base material is transparently vitrified using an electric furnace with a quartz furnace tube. The porous base material is configured to move downwardly in the furnace tube while it is shut out the air. The porous base material progressively passes through a region heated at a high temperature with a heater which is provided on a part of the furnace tube, so that the porous base material is dehydrated and transparently vitrified.

In addition, a first port for introducing ambient gas is provided on the lower portion of the furnace tube. The top of the furnace tube can be covered with a lid, and a shaft to which the porous base material is attached can go up and down through the lid. The lid has a second port for exhausting the gas in the furnace tube.

Figure 2:
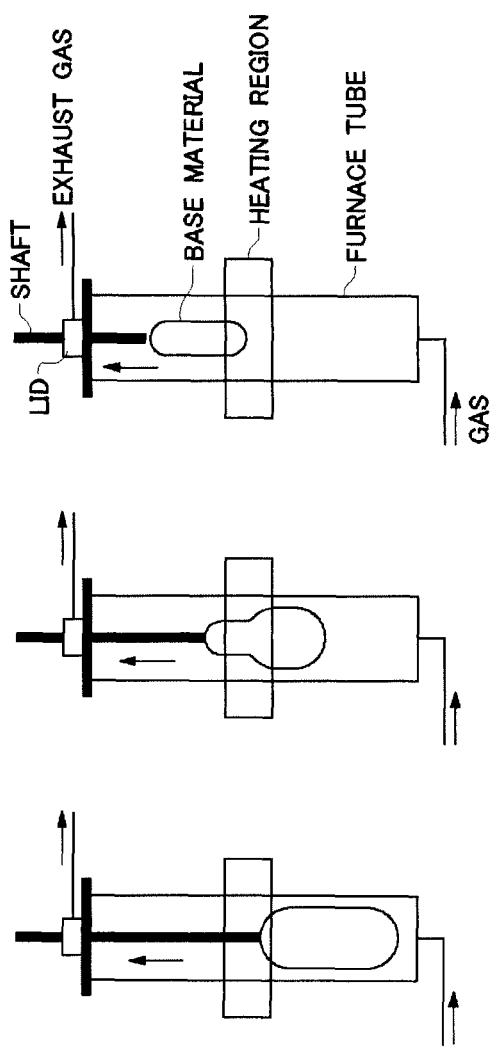
FIGS. 2A-2C are schematic views progressively explaining a moving direction of the base material during transparently vitrifying in Embodiment 1.

The porous base material which is formed by depositing glass particles by VAD is suspended in the above described electric furnace. Then, the porous base material is dehydrated at 1100 degrees Celsius as being moved upwardly under the atmosphere containing chlorine of 10% and helium of 90%. Next, after the porous base material moves downwardly to a starting position of transparently vitrifying once while the temperature is maintained, the porous base material is transparently vitrified at 1500 degrees Celsius as being moved upwardly again under the atmosphere containing He of 100% as shown in FIGS. 2A, 2B and 2C in the order named. Therefore, a core member for an optical fiber is formed.

The obtained core member has the ratio of the core diameter to the cladding diameter being 0.20. Since this is not sufficient for a single-mode optical fiber, a cladding is added to the core member by OVPO (Outside Vapor Phase Oxidation) in order to form a complete glass base material for an optical fiber. When the cladding is added to the core member by OVPO, it is necessary to draw the core member once, and the core member is drawn by oxyhydrogen flame with a glass lathe. Next, the porous base material which is obtained by depositing glass particles by OVPO is dehydrated and transparently vitrified under the atmosphere containing helium and chlorine.

Figure 3:
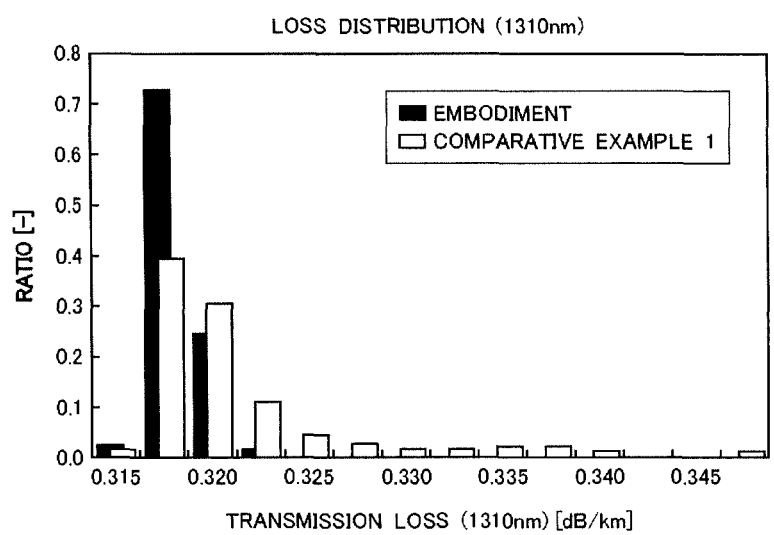
FIG. 3 is a graph explaining a distribution of transmission losses of the optical fiber obtained in Embodiment 1 and Comparative Example 1.

When the glass base material for an optical fiber manufactured as described above is drawn, an optical fiber having a good loss characteristic can be obtained. Specifically, the transmission loss for the full length 1310 nm of the glass base material is stabilized around 0.32 dB/km. When one hundred glass base materials are manufactured as well, a variation in the loss characteristic is significantly small as shown in FIG. 3.

Comparative Example 1

Figure 4:
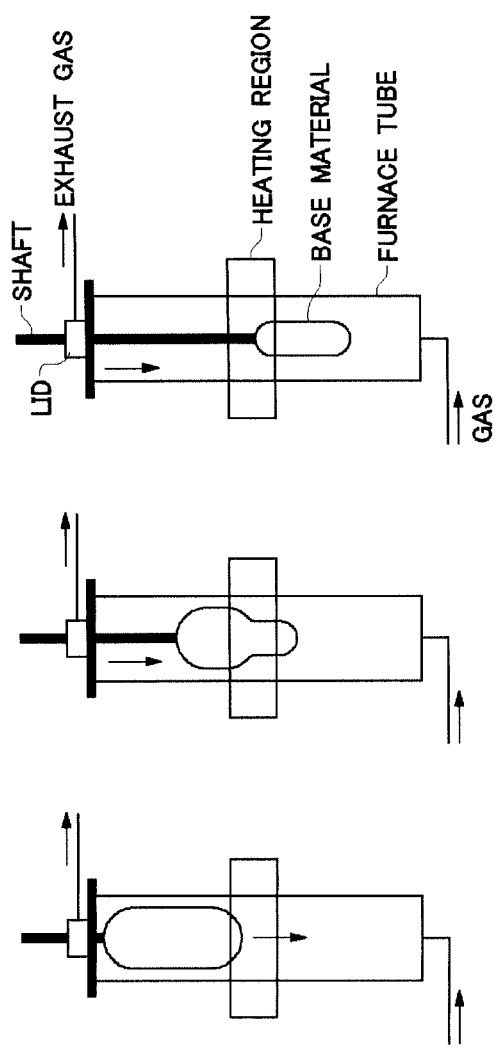
FIGS. 4A-4C are schematic views progressively explaining a moving direction of the base material during transparently vitrifying in Comparative Example 1.

A porous base material manufactured by the same process as Embodiment 1 is inserted into the furnace from above. The porous base material progressively dehydrated from the bottom end thereof as being fallen down at an appropriate speed. After the dehydration is completed, the base material is pulled up to the upper portion of the furnace once. Then, the base material is transparently vitrified progressively from the bottom end thereof as being fallen down at an appropriate speed again as shown in FIGS. 4A, 4B and 4C in the order named. Therefore, a core member for an optical fiber is formed. Further, a cladding is added to the core member by OVPO, and then, the core member with the cladding is dehydrated and transparently vitrified, so that a glass base material for an optical fiber can be obtained.

The glass base material manufactured as described above is drawn, and then, the loss characteristic of the obtained optical fiber is examined. As a result, the transmission loss for the length of 1310 nm is varied between 0.32 dB/km and 0.34 dB/km. Among one hundred optical fibers manufactured as well, one or more exhibits a high transmission loss such as 0.36 dB/km as shown in FIG. 3. Viewed in the longitudinal direction, many glass base materials show that the transmission loss is higher in the upper portion than in the lower portion as shown in FIG. 1.

Comparative Example 2

The porous base material manufactured by the same process as Comparative Example 1 is used. In a step of dehydrating, the base material is dehydrated as moving downwardly in the same manner as Comparative Example 1. Next, in a step of transparently vitrifying, the temperature rises to transparently vitrify the base material while the base material is held in the lower portion of the furnace tube. After the temperature is sufficiently increased, the base material is transparently vitrified as being moved upwardly, so that a core member for an optical fiber is formed. Further, a cladding is added to the core member by OVPO, and then, the core member is dehydrated and transparently vitrified to obtain a glass base material for an optical fiber.

Figure 5:
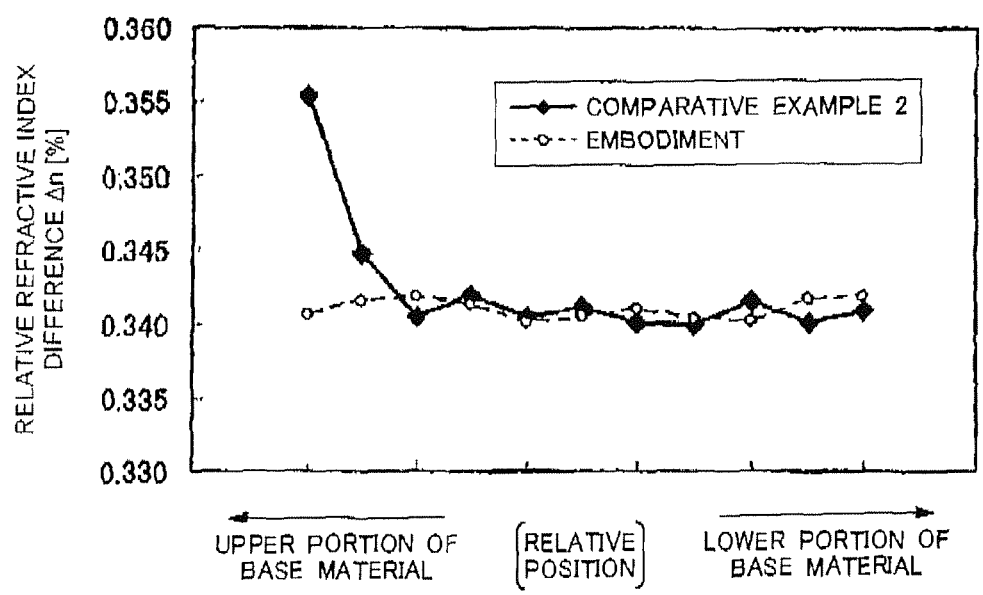
FIG. 5 is a graph showing a relationship between positions in the longitudinal direction of the base material which are obtained in Embodiment 1 and Comparative Example 2 and relative index differences.
Figure 6:
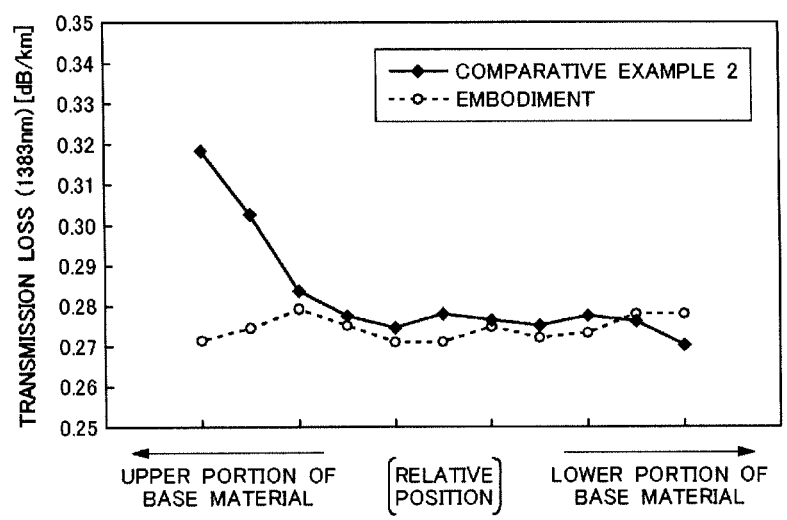
FIG. 6 is a graph showing a relationship between positions in the longitudinal direction of the base material which are obtained in Embodiment 1 and Comparative example 2 and transmission losses of an optical fiber obtained by drawing.

An optical fiber obtained by drawing the glass base material shows that the refractive index of the core is higher than usual in the upper portion of the base material as shown in FIG. 5. In addition, the base material is not sufficiently dehydrated and has a higher loss for the length of 1383 nm due to hydroxy group in the upper portion as shown in FIG. 6.

The above-described embodiments do not limit the invention. The above-described embodiments are only illustrative, and includes a configuration substantially the same as the technical concept recited in the claims of the invention. Any configuration that has the same effects or advantages is intended to be included in the technical concept of the present invention.

The method of manufacturing the present invention provides an optical fiber having an excellent transmission characteristic.

What is claimed is:

1. A method of manufacturing an optical fiber base material, comprising the steps of:
  depositing glass particles to form a base material;
  dehydrating and transparently vitrifying the base material to form a core member;
  drawing the core member; and
  forming a cladding material on the drawn material at a predetermined core to cladding ratio,
  wherein the dehydrating step comprises suspending the base material in a quartz furnace tube having a heating region in a first atmosphere at a first temperature and moving the base material through the heating region in an upward motion,
  wherein the transparently vitrifying step comprises passing the dehydrated base material through the heating region in a second atmosphere at a second temperature in an upward motion,
  wherein the base material moves during the dehydrating step and the transparently vitrifying step in the same direction as a gas flowing direction in the quartz furnace tube,
  the second temperature is in the range between 1300 and 1600 degrees Celsius while the first temperature is in the range between 900 and 1200 degrees Celsius, and
  the first atmosphere comprises chlorine of 10% by volume and an inert gas of 90% by volume, while the second atmosphere comprises an inert gas of 100% by volume.

2. The method of claim 1, wherein the transparently vitrifying step comprises
  moving the base material to a starting position of the transparently vitrifying step while the first temperature is maintained after the dehydrating has been completed and starting the transparently vitrifying step in a further elevated temperature.

3. The method of claim 1, wherein the base material is porous.

4. The method of claim 1, wherein the time period between the end of the dehydrating step and the start of the transparently vitrifying step is substantially the same for the first position as it is for the second position.

5. The method of claim 1, wherein the first temperature is about 1100 degrees Celsius.

6. The method of claim 1, wherein the inert gas is helium.

7. The method of claim 1, wherein, before the core member is drawn, the core member has a core and a cladding and the ratio of the core diameter to the cladding diameter is approximately 0.20.

8. The method of claim 1, wherein an optical fiber drawn from the optical fiber base material has a transmission loss of approximately 0.32 dB/km at a wavelength of 1310 nm over a full length of the optical fiber.

9. A method of manufacturing an optical fiber comprising:
  the method according to claim 1; and
  drawing the optical fiber base material to produce an optical fiber having a transmission loss of approximately 0.32 dB/km at a wavelength of 1310 nm over a full length of the optical fiber.

10. A method of manufacturing an optical fiber base material, comprising the steps of:
  providing a base material that comprises glass particles and has an elongated shape in a longitudinal direction;
  dehydrating the base material at a first temperature as the base material progressively passes in the longitudinal direction through a heating region in a gas atmosphere within a quartz furnace tube, the base material being dehydrated from a first position to a second position of the base material; and
  transparently vitrifying the dehydrated base material while progressively passing the dehydrated base material in the longitudinal direction through the heating region at a second temperature to form a core member, the dehydrated base material being transparently vitrified from the first position to the second position,
  wherein the quartz furnace tube has an inlet through which gas that forms the gas atmosphere is introduced and an outlet through which the gas is exhausted,
  wherein a direction from the inlet to the outlet is the same as a direction from the second position to the first position,
  wherein the second temperature is in the range from about 1300 to about 1600 degrees Celsius while the first temperature is in the range from about 900 to about 1200 degrees Celsius, and
  wherein the gas atmosphere in the dehydrating step comprises chlorine of 10% by volume and an inert gas of 90% by volume, while the gas atmosphere in the transparently vitrifying step comprises inert gas of 100% by volume.

11. The method of claim 10, further comprising:
  drawing the core member after the transparently vitrifying step to form a drawn core member; and
  forming a cladding on the drawn core member.

12. The method of claim 11, wherein, before the core member is drawn, the core member has a core and a cladding and the ratio of the core diameter to the cladding diameter is approximately 0.20.

13. The method of claim 10, wherein the time period between the end of the dehydrating step and the start of the transparently vitrifying step is substantially the same for the first position as it is for the second position.

14. The method of claim 10, wherein the direction from the inlet to the outlet is substantially vertical and upward.

15. The method of claim 10, wherein the transparently vitrifying step starts while a temperature of the base material is maintained equal to or higher than a temperature at the end of the dehydrating step.

16. The method of claim 10, wherein the first temperature is about 1100 degrees Celsius.

17. The method of claim 10, wherein the inert gas is helium.

18. The method of claim 10, wherein an optical fiber drawn from the optical fiber base material has a transmission loss of approximately 0.32 dB/km at a wavelength of 1310 nm over a full length of the optical fiber.

19. A method of manufacturing an optical fiber comprising:
  the method according to claim 10; and
  drawing the optical fiber base material to produce an optical fiber having a transmission loss of approximately 0.32 dB/km at a wavelength of 1310 nm over a full length of the optical fiber.

* * * * *